Dec. 16, 1924. 1,519,545
M. A. MARQUETTE
METHOD OF MAKING TIRES
Filed April 21, 1920
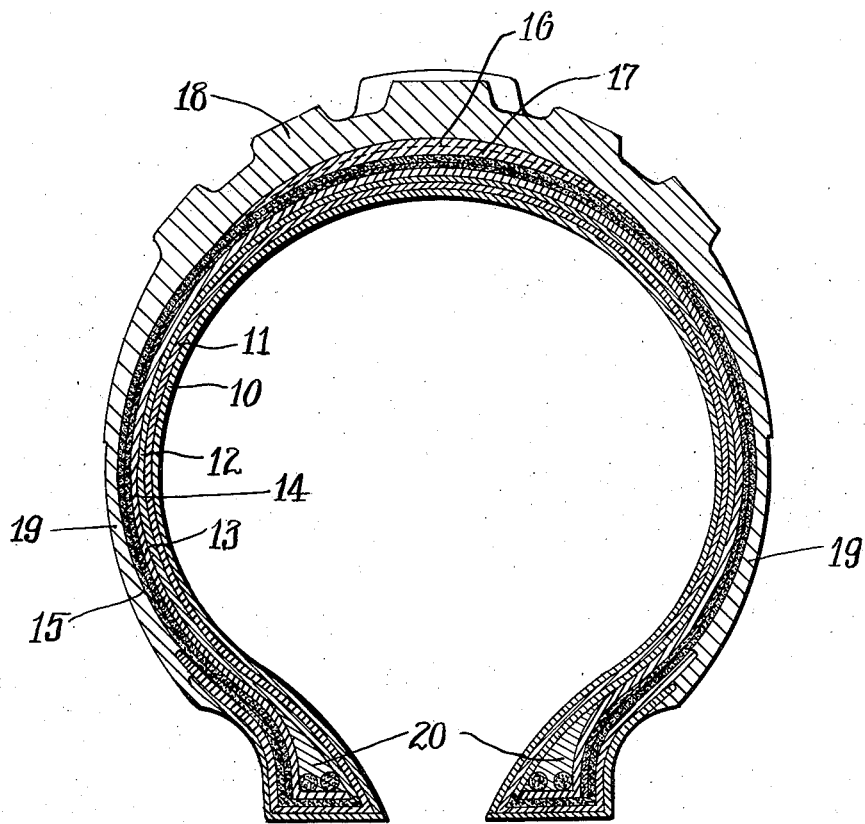
INVENTOR
Melvon A. Marquette.
BY
ATTORNEY Patented Dec. 16, 1924.

1,519,545

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF MAKING TIRES.

Application filed April 21, 1920. Serial No. 375,471

*To all whom it may concern:*

Be it known that I, MELVON A. MARQUETTE, a citizen of the United States of America, residing at Chicopee Falls, in the county of Hampden and State of Massachusetts, have invented certain new and useful Improvements in a Method of Making Tires, of which the following is a specification.

My present invention relates to methods of making tire casings, and has particular reference to their building and vulcanization.

It has for its object the formation of a tire casing in an expeditious manner while reducing the danger of the formation of buckles or wrinkles in the fabric. It has various other objects which will appear from the description and claims.

It is a known fact that when tire casings are subjected to the pressure of the usual two-part vulcanizing molds, including a rigid core and an outer split rigid mold, the flowing of the rubber as the mold contracts upon it tends to carry the fabric with it, causing buckles at the line of intersection of the mold sections and waves following approximately the pattern of the non-skid tread. This is particularly true in the case of tire casings built up out of the so-called cord fabric, which consists of a series of cords forming a warp, either with or without a series of light weft threads, as this fabric has less resistance to distortion than the ordinary square-woven fabric. I have found that by stiffening the outer ply or plies of fabric it is possible to maintain the fabric in the position in which it was laid while the rubber flows over it, and to thus dispense with the use of water bags. This stiffening may be performed in various ways.

For example, I may partially vulcanize the outer ply or plies of fabric before building them into the casing, or even after they are so built. Or I may place over the fabric plies a partially-vulcanized sheet of rubber; and I contemplate either partially vulcanizing the cushion stock and the breaker for this purpose, or using a separate sheet of partially-vulcanized rubber.

Other ways in which any of the layers mentioned above may be stiffened is by subjecting them to any air drying process rather than to a true partial vulcanization; by solutioning the fabric rather than by frictioning it; or using for such layers a rubber compound that will be stiff when cold. Or the stock may be frictioned in the usual manner, then partially vulcanized, and a skim coat of uncured rubber applied before building the fabric into the casing. It will be understood that such stock as is built into the casing in a partially vulcanized condition may be compounded so that it will have its vulcanization completed in the same time as that necessary for the unvulcanized stock which is built into the casing to become completely vulcanized, as is well understood in the art. It is not necessary that the stiffened stock maintain its resistance after it becomes heated, for the deleterious initial pressure of the molds occurs when the rubber is cold; and by the time that the casing has become heated the rubber has flowed to its ultimate position.

Therefore, another way to accomplish my principal object is by heating the outer rubber of the casing sufficiently to soften it but not enough to materially affect the bonding rubber of the carcass. Then while this outer rubber is warm and the bonding rubber is cold the mold pressure is applied by closing the molds. The result will be to mold the covering rubber while warm so that it will flow freely for the molding operations without disturbing the fabric of the casing which is bonded together by the stiff cold rubber during the movement of the molds. When the vulcanizing heat is then applied to the whole casing, the latter has been set in the molds and is held by the mold pressure. Or the fabric layers may be chilled relative to the tread to produce the same relative effect. This specific form of my invention is claimed in my divisional patent, No. 1,419,879, dated June 13, 1922.

The results desired may be accomplished either by stiffening the fabric or by warming the outer layers of rubber in preparation for the application of the mold pressure, or the two ways may be used together.

Referring now to the drawing, which is a cross section of a tire casing of the usual type, and illustrates one form of my improved method diagrammatically, the carcass or fabric portion of the tire is composed in this instance of six plies of fabric, 10, 11, 12, 13, 14 and 15. Over this fabric carcass is placed the breaker 16 combined with the cushion stock 17. A tread 18 of rubber and side walls 19 complete the outside of the casing, while the fabric plies are secured by bead members 20 of any suitable form. As illustrated in the drawings the outer two plies of fabric, 14 and 15, are stiffened as by a partial vulcanization, as is indicated diagrammatically by the stippling. Although the stiffening process has been shown as having been applied to two plies, it may be restricted to a single ply in case the shifting action of the non-skid mold is not great, or if for any other reason the resistance to shifting of a single ply is found sufficient.

It is desirable to restrict the stiffened layers to the outside of the carcass for several reasons. In the first place, if the partial vulcanization is applied throughout the thickness of the carcass, it is necessary to cement between each layer, this making several points of weakness. If, however, the outer two plies only are partially vulcanized, they may be cured together under pressure, thus producing a firm bond; and the vulcanization of these partially cured layers to the adjacent uncured layers does not present the same difficulties as does the vulcanization together of two partially vulcanized surfaces. The remaining plies are cured together in the usual manner, thus giving a tire having vulcanized union between all the layers of stock. Furthermore, by partially vulcanizing the outermost plies of fabric a more uniform condition of vulcanization is secured, as the normal tendency is for these plies to be undercured, for the reason that they are the furthest removed from the heat conducting mold and core which contact with the outer and inner surface of the casing. The partial cure given these plies will counteract this tendency to undercuring. If the partial cure is not great in amount it will not be necessary to provide a different compound for these plies, but ordinarily it is desirable to compensate for the overcuring in this manner.

I claim:

1. The method of making tire casings comprising building up the casing with one or more plies at the outside of the carcass stiffened with respect to the plies at the inside of the carcass, and vulcanizing the casing.

2. The method of making tire casings comprising building up the carcass of plies of unvulcanized rubberized material with one or more partially vulcanized plies at the outside of the carcass, and completing the vulcanization of the casing.

3. The method of making tire casings comprising building up the casing with one or more plies at the outside of the carcass stiffened with respect to the plies at the inside of the carcass, and with a tread and side walls, and vulcanizing the casing under molding pressure.

4. The method of making tire casings comprising building up the casing with its carcass portion composed of plies of unvulcanized rubberized material with one or more partially vulcanized plies at the outside of the carcass, and with a tread and side walls, and completing the vulcanization of the casing between a core and a tread-forming mold.

5. The method of making tire casings comprising partially vulcanizing one or more plies of the carcass fabric located at the outside of the series of plies and applying molding pressure to the rubber of the tread and side walls while such rubber is warm enough to flow freely and while the bonding rubber of the carcass fabric is cold.

6. The method of making tire casings comprising building up the unmolded tire body with carcass and tread portions assembled and with a zone of material at the junction of the two portions preliminarily vulcanized to a higher degree than the rest of the casing, applying molding pressure to the casing, and vulcanizing it.

MELVON A. MARQUETTE.